United States Patent

Wen et al.

[11] Patent Number: 6,081,285
[45] Date of Patent: Jun. 27, 2000

[54] FORMING IMAGES ON RECEIVERS HAVING FIELD-DRIVEN PARTICLES AND CONDUCTING LAYER

[75] Inventors: Xin Wen, Rochester; Steven D. MacLean, Webster, both of N.Y.

[73] Assignee: Eastman Kodak Company, Rochester, N.Y.

[21] Appl. No.: 09/067,730

[22] Filed: Apr. 28, 1998

[51] Int. Cl.[7] .......................... B41J 2/385; G02B 26/00
[52] U.S. Cl. .......................... 347/111; 345/107; 359/296
[58] Field of Search ................. 346/21; 347/111, 347/112; 428/206, 323; 345/85, 107; 430/37; 359/296

[56] References Cited

U.S. PATENT DOCUMENTS

| | | | |
|---|---|---|---|
| 4,143,103 | 3/1979 | Sheridon | 264/4 |
| 5,344,594 | 9/1994 | Sheridon | 264/4.1 |
| 5,389,945 | 2/1995 | Sheridon | 345/85 |
| 5,604,027 | 2/1997 | Sheridon | 428/323 |
| 5,708,525 | 1/1998 | Sheridon | 359/296 |
| 5,723,204 | 3/1998 | Stefik | 428/206 |
| 5,866,284 | 2/1999 | Vincent | 430/37 |

FOREIGN PATENT DOCUMENTS

WO 97/04398  2/1997  WIPO .

OTHER PUBLICATIONS

Field and Wage Electromagnetics, Second Edition, by David K. Cheng, pp. 159–161, 1992.
"A Newly Developed Electrical Twisting Ball Display", by M. Saitoh, et al, Proceedings of the SID vol. 23/4, 1982, pp. 249–253.

Primary Examiner—N. Le
Assistant Examiner—L. Anderson
Attorney, Agent, or Firm—Raymond L. Owens

[57] ABSTRACT

An electronic printing apparatus is disclosed for forming images on a receiver which stores a digital image. The apparatus uses a receiver that includes field-driven particles in a matrix that change optical density in response to an applied electric field, a substrate, and a conductive portion disposed between the matrix and the substrate. The apparatus further includes an array of electrodes cooperating with the conductive portion for selectively applying electric fields across the matrix at the image forming position so that the field-driven particles change optical density, and electronic control circuitry electrically coupled to the array and the conductive portion for selectively applying voltages to the array so that fields are applied at the image forming position to field-driven particles at particular locations on the receiver corresponding to pixels in the stored image whereby the electrodes produce an image in the receiver corresponding to the stored image.

4 Claims, 2 Drawing Sheets

FORMING IMAGES ON RECEIVERS HAVING FIELD-DRIVEN PARTICLES AND CONDUCTING LAYER

CROSS REFERENCE TO RELATED APPLICATIONS

The present invention is related to commonly assigned U.S. patent application No. 09/035,606 filed Mar. 5, 1998, entitled "Forming Images on Receivers Having Field-driven Particles" to MacLean et al commonly assigned U.S. patent application No. 09/035,516 filed Mar. 5, 1998, entitled "Heat Assisted Image Formation In Receivers Having Field-Driven Particles" to Wen et al commonly assigned U.S. patent application No. 09/034,066 filed Mar. 3, 1998, entitled "Printing Continuous Tone Images On Receivers Having Field-Driven Particles"; and commonly assigned U.S. patent application No. 09/037,229 filed Mar. 10, 1998, entitled "Calibrating Pixels In A Non-Emissive Display Device" to MacLean et al. The disclosure of these related applications is incorporated herein by reference.

FIELD OF THE INVENTION

This invention relates to an electronic printing apparatus for producing images on a receiver having electric field-driven particles.

BACKGROUND OF THE INVENTION

There are several types of electric field-driven particles. One class is the so-called electrophoretic particle that is based on the principle of movement of charged particles in an electric field. In an electrophoretic receiver, the charged particles containing different optical densities can be moved by an electric field to or away from the viewing side of the receiver, which produces a contrast in the optical density. Another class of electric field-driven particles are particles carrying an electric dipole. Each pole of the particle is associated with a different optical densities (bi-chromatic). The electric dipole can be aligned by a pair of electrodes in two directions, which orient each of the two polar surfaces to the viewing direction. The different optical densities on the two halves of the particles thus produces a contrast in the optical densities. The receivers typically have a substrate for supporting the imaging layer that contains the field-driven particles. The substrate can be in the range of 75–750 $\mu$m in thickness.

The image pixels in the above described receivers are formed by varying the electric field applied to the field-driven particles at each pixel. The electric fields can be produced by applying an electric voltage between a pair of electrodes across the two surfaces of the receiver to drive field-driven particles at that pixel. One difficulty in achieving high-quality images in such receivers is caused by the limited strength of the electric field. For a field strength of an electric field across the receiver, the electric potential across the pair of electrodes is proportional to the thickness of the receiver. High driving voltages are thus needed for driving the field-driven particles for the thick receivers, which requires more complex and expensive driver electronics, as well as more power consumption.

Another difficulty in achieving high quality images on such receivers is caused by the receiver material thickness. The thickness of the receiver material limits the minimum separation between the electrodes in each pair. The separation between the electrodes limits the maximum image resolution achievable on the receiver.

SUMMARY OF THE INVENTION

It is an object of the present invention to provide an electronic printing apparatus which uses a specially designed receiver that produces improved resolution images on a receiver having electric field-driven particles.

Another object of the present invention is to display images in an energy-, time-, and cost-efficient manner.

These objects are achieved by an electronic printing apparatus for forming images on a receiver, comprising:

a) means for storing a digital image;

b) the receiver including field-driven particles in a matrix that change optical density in response to an applied electric field, a substrate, and a conductive portion disposed between the matrix and the substrate;

c) an array of electrodes cooperating with the conductive portion for selectively applying electric fields across the matrix at the image forming position so that the field-driven particles change optical density; and d) electronic control means electrically coupled to the array and the conductive portion for selectively applying voltages to the array so that fields are applied at the image forming position to field-driven particles at particular locations on the receiver corresponding to pixels in the stored image whereby the electrodes produce an image in the receiver corresponding to the stored image.

ADVANTAGES

An advantage of the present invention is that using an embedded conducting layer permits a significant improvement in image resolution.

Another advantage of the present invention is the provision of a conductive layer that is used in a receiver having a matrix of field-driven particles which facilitates improvements in image resolution and other operating features of a display device such as minimizing electrical power.

An additional advantage is that in displays made in accordance with the present invention the electric voltage required for producing the electric field is reduced in the electronic printing apparatus.

A further feature of the invention is that simpler and less expensive electronics can be used to produce the electric voltage at each pixel.

DETAILED DESCRIPTION OF THE INVENTION

Figure 1:
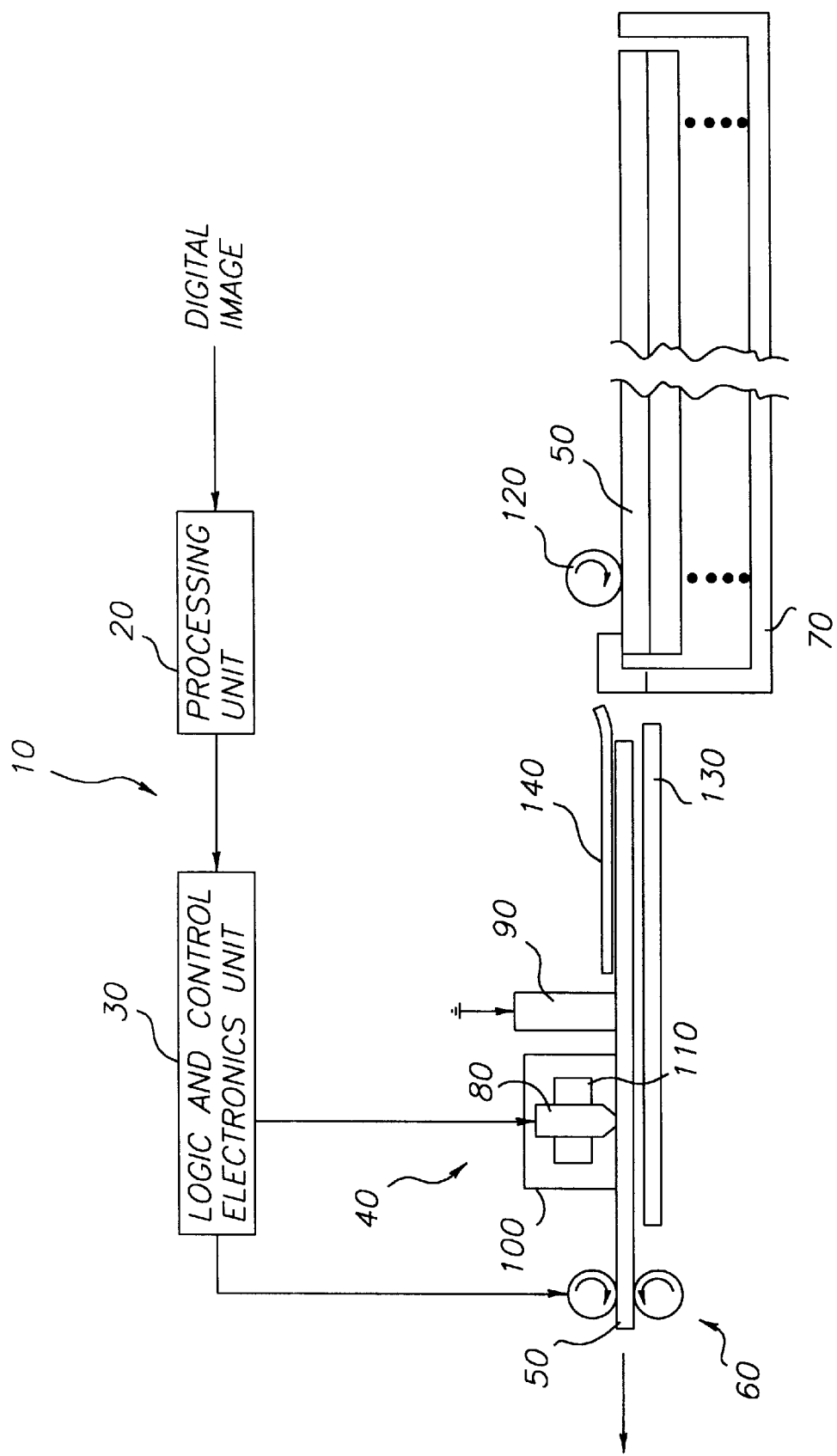
FIG. 1 shows an electronic printing apparatus in accordance to the present invention.

FIG. 1 shows the electronic printing apparatus 10 in accordance to the present invention. The electronic printing apparatus 10 includes a processing unit 20, a logic and control electronics unit 30, a print head 40, a receiver 50 that comprises electric field-driven particles in a matrix (see FIG. 3), a receiver 30 transport 60, a receptacle 70, and a common electrode 90. The print head 40 includes an array of top electrode 80 corresponding to each pixel of the image forming position on the receiver 50. The array of top electrodes 80 is contained in an electrode structure 110 formed by an insulating material such as polystyrene, ceramics, and plastics. An electric voltage is applied between the array of top electrodes 80 and the common electrode 90 at each pixel location on the receiver 50 to produce the desired optical density at that pixel. The electric voltage is controlled by logic and control electronics unit 30 according to the input digital image after it is processed by processing unit 20. An electrically grounded shield 100 is provided to electrically isolate the print head 40 from the background electric fields. The common electrode 90 of FIG. 1 is provided in an upstream position to the print head 40 in the direction of the receiver movement. The common electrode 90 is in a pressure contact with the top surface of the receiver 50 with a large contact surface area. The common electrode 90 keeps the conducting layer 250 (FIG. 3) at a ground potential through capacitive coupling during the printing process. It is understood that the common electrode may be connected to any low impedance source without substantially modifying the invention. The common electrode can also be connected to an electric potential different from the ground potential. The detailed functions of the common electrode 90 will be discussed below in relation to FIG. 3.

The receiver 50 is shown to be picked by a retard roller 120 from a receptacle 70. Other receiver feed mechanisms are also compatible with the present invention: for example, the receiver 50 can be fed in single sheets or by a receiver roll equipped with cutter. The term "receptacle" will be understood to mean a device for receiving one or more receivers including a receiver tray, a receiver roll holder, a single sheet feed slot etc. During the printing process, the receiver 50 is supported by the platen 130 and guided by the guiding plate 140, and is transported by the receiver transport 60. The platen 130 and the guiding plate 140 are preferably made of conducting materials and are connected to a ground potential. These provide additional capacitive coupling to the conductive layer 250 (FIG. 3)

Figure 2:
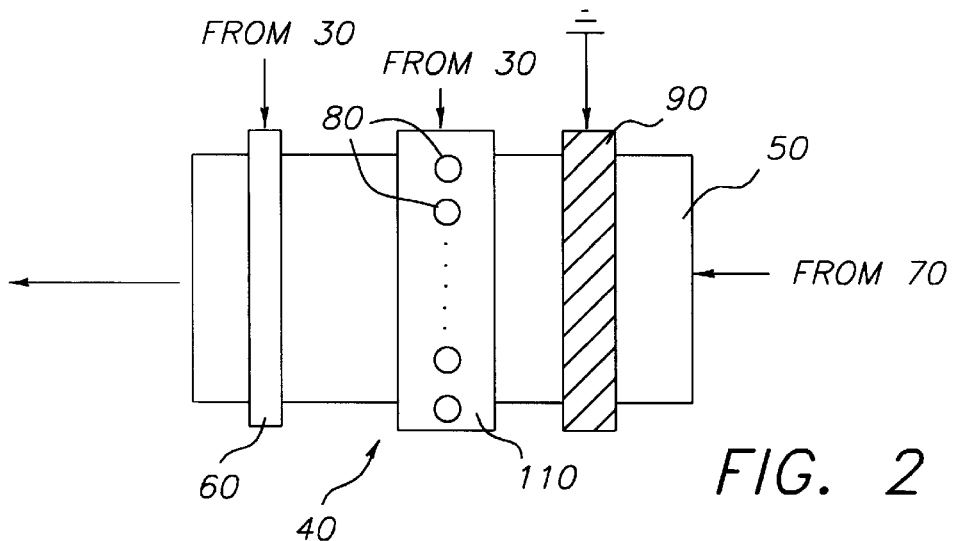
FIG. 2 shows a partial top view of the structure of the electronic printing apparatus.

FIG. 2 shows a top view of the structure around the print head 40. For clarity reasons, only selected components are shown. The receiver 50 is shown to be transported under the print head 40 by the receiver transport 60 that is controlled by the logic and control electronics unit 30. The common electrode 90 is provided in an upstream position to the print head 40 in the direction of the receiver movement. The print head 40 includes a plurality of top electrodes 80, each corresponding to one pixel. The top electrodes 80 are also controlled by the logic and control electronics unit 30. The top electrodes 80 are located within holes in the electrode structure 110. The top electrodes 80 are distributed in a linear fashion to form a linear array as shown in FIG. 2 to minimize electric field fringing effects between adjacent pixels printed on the receiver 50. Different printing resolutions are achievable across the receiver 50 by the different arrangements of the top electrodes 80, including different electrode spacing. The printing resolution down the receiver 50 can also be changed by controlling the receiver transport speed by the receiver transport 60 or the rate of printing by controlling the logic and control electronics unit 30.

Figure 3A:
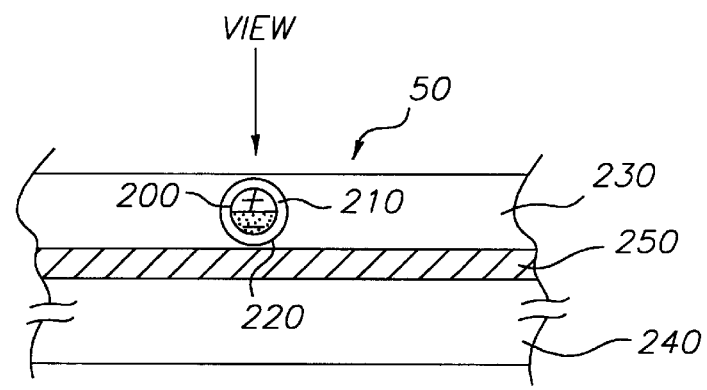
FIG. 3a and 3b show a cross sectional view of the receiver used in the apparatus of FIG. 1 and which includes a conducting layer.
Figure 3B:
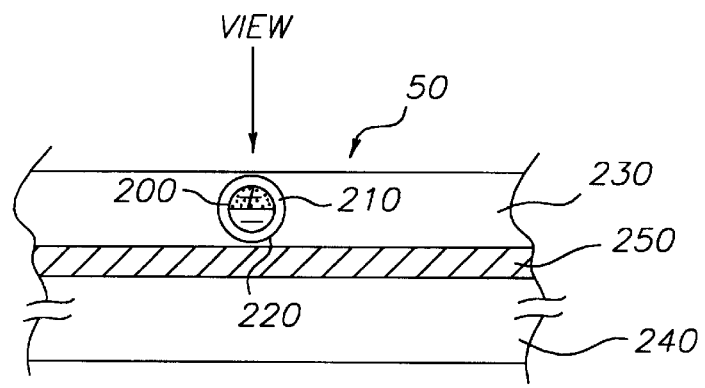

FIGS. 3a and 3b show cross sectional views of the receiver 50 of FIG. 1 with a field-driven particle in different states. The receiver 50 includes a substrate 240. The substrate 240 can be made of a natural fiber paper, a synthetic fiber paper or a polymer film. A conducting layer 250 is disposed on the substrate 240. The conducting layer 250 can be formed by laminating a aluminum sheet to the substrate 240. In general, the conducting layer is a conducting portion in the receiver 50. Alternative conducting layers are discussed below. A matrix 230 is formed on the conductive layer 250. The matrix 230 comprise a plurality of electric field-driven particles 200. The electric field-driven particles 200 are exemplified by bi-chromatic particles, that is, half of the particle is white and the other half is of a different color density such as black, yellow, magenta, cyan, red, green, blue, etc. The bi-chromatic particles are electrically bi-polar. Each of the color surfaces (e.g. white and black) is aligned with one pole of the dipole direction. The stable electric field-driven particles 200 are suspended in a fluid 210 such as oil which are together encapsulated in a microcapsule 220. The microcapsules 220 are immersed in matrix 230. An electric field induced in the microcapsule 220 align the field-driven particles 200 to a low energy direction in which the dipole opposes the electric field. When the field is removed the particles state remains unchanged. FIG. 3a shows the particle 200 in a white state as a result of field previously imposed by a negative voltage applied to top electrode 80 of FIG. 1. FIG. 3b shows the particle 200 in the black state as a result of field previously imposed by a positive voltage applied to top electrode 80 of FIG. 1.

A typical range for the thickness of the substrate 240 is 50–750 $\mu$m. The material of the substrate 240 preferably provides the receiver a look and the feel of the high quality paper (e.g. photographic paper). The substrate 240 controls the flexibility and durability of the receiver 50. The substrate 240 can include natural or synthetic paper, polymer film. In some applications, rigid substrate such as glass and ceramics can also be used. The thickness of the conducting layer 250 is not critical to its function (as long as the conducting layer is strong enough for its uniformity and connectivity), as discussed below. A typical thickness range for the conducting layer 250 is 25–75 $\mu$m. The thickness of the matrix 230 can vary depending on the specific display application. A typical range is between 0.1 $\mu$m and 100 $\mu$m.

The conducting layer 250 can be a sheet made of metallic or semiconductive materials as aluminum that have sufficient ductility and conductivity. The conductive layer 250 can be laminated to the substrate 240, or formed by a number of deposition and coating techniques including vapor deposition, ion sputtering, solution coating on the substrate 240. The conducting layer 250 can also be formed in a portion of the substrate 240 by doping the surface of the substrate. The conductive layer 250 can also be provided by a conductive substrate 240.

The common electrode 90 is electrically coupled, specifically capacitively coupled, to a conducting layer 250 (in FIG. 3) in the receiver 50. The common electrode 90 is in pressure contact with the top surface of the receiver 50 with a large contact surface area, which provides a large coupling capacitance and small AC impedance between the common electrode 90 and the conducting layer 250 in the receiver 50. During the image printing process, the electric voltages are applied by the top electrodes 80, in cooperation with the common electrode 90 and the conducting layer 250, each pixel location on the receiver 50 according to the input image. Different lines of the digital image are printed by the print head 40 as the receiver 50 is transported by the receiver transport 60. The electric fields produced by the electric voltages at the pixels induce electric charges on the conducting layer 250, but the high conductivity of the conducting layer 250 maintains an equal potential throughout the conducing layer 250. The capacitive coupling between the common electrode 90 and the conducting layer 250 keep the conducting layer essentially at a ground electric potential as the alternating voltages are applied in the printing process. The large contact area between the common electrode 90 and the receiver 50 minimizes the strength of the electric field induced on the field-driven particles 200 in the matrix 230 near the common electrode 90. The configurations of the field driven particles are thus not changed by the common electrode 90. Since the common electrode is located upstream to the print head 40, the new digital image printed by print head 40 remains unaffected by the common electrode 90.

The advantage of the conducting layer is now described. An approach to provide an electric field to the field-driven particles 200 is to apply an electric voltage across the two surfaces of the receiver 50 (in the absence of a conducting layer with a pair of electrodes. In this approach, an electric field strength required to drive the field-driven particles require a significantly high electric voltage because the required electric voltage is proportional to the total receiver thickness, which corresponds to the separation of the electrodes. The high voltage produces complexity in the driving circuitry for the print head and also increases power consumption. In contrast, the electric field on the field driven particles 200 in accordance with the present invention is applied between the top electrode 80 and the conduction layer 250. This produces an induced charge in the conduction layer 250. The induced charges can be described by the method of images as discussed in "Field and Wave Electromagnetics" by David K. Cheng pp159–161, 1992. The induced charges produce an image of the electrodes with the opposite polarity located equidistant from the conducting layer. This image electrode is located at a distance corresponding to twice the thickness of matrix 230 from the top electrode 80. This distance is substantially less than the thickness of the receiver 50. The voltage required is therefore greatly reduced. The reduced voltage permits the use of lower voltage and simpler drive electronics such as CMOS (Complimentary Metal Oxide Semiconductor) rather than the higher voltage and the more complex drive electronics such as DMOS (Diffusion Metal Oxide Semiconductor). The reduced separation of the electrodes also provides an additional benefit of an electric field which falls off more rapidly, creating a reduced pixel size and therefore improved resolution.

It is understood that although an AC capacitive coupling is shown above between the conducting layer 250 and the common electrode 90, other types of electric couplings such as a direct electric connection can also be implemented between the conducting layer 250 and the common potential. Direct connection would be achieved by selectively removing portions of the matrix 230 to expose a strip of conducting layer 250 and forming a connection with a brush electrode.

The field-driven particles can include many different types, for example, the bi-chromatic dipolar particles and electrophoretic particles. In this regard, the following disclosures are herein incorporated in the present invention. Details of the fabrication of the bi-chromatic dipolar particles and their addressing configuration are disclosed in U.S. Pat. Nos. 4,143,103; 5,344,594; and 5,604,027, and in "A Newly Developed Electrical Twisting Ball Display" by Saitoh et al p249–253, Proceedings of the SID, Vol. 23/4, 1982, the disclosure of these references are incorporated herein by reference. Another type of field-driven particle is disclosed in PCT patent application WO 97/04398. It is understood that the present invention is compatible with many other types of field-driven particles that can display different color densities under the influence of an applied electrical field.

Referring to FIG. 1, an electronic printing apparatus 10 in accordance with the present invention is shown. A user sends a digital image to a processing unit 20. Processing unit 20 receives the digital image and stores it in an internal memory. It will be understood that the term "digital image" can include only a portion of the finally produced image in the receiver, for example, a line of the image. In such a situation, an input line buffer can be used in the processing unit 20. All processes are controlled by processing unit 20 via which works with logic and control electronics unit 30. The logic and control electronics unit 30 addresses electrodes to provide electric fields as will be subsequently described. A receiver 50 is picked from a receptacle 70 by a retard roller 120. The receiver 50 is advanced until the leading edge engages receiver transport 60. Retard roller 120 produces a retard tension against receiver transport 60 which controls receiver 50 motion. As the receiver 50 is transported past the image forming position under the array of electrodes, each pixel of the digital image produced by an electric field applied by the top electrodes 80 relative to the conducting layer 250. The conducting layer 250 is held to the ground potential by capacitively coupling to the common electrode 90. Each pixel location is driven according to the input digital image to produce the desired optical density as described in FIGS. 3a and 3b. The pixel is selected from the digital image to adjust for the relative location of each electrode pair and transport motion. The receiver transport 60 advances the receiver 50 a displacement which corresponds to a pixel pitch. The next set of pixels are written according to the current position. The process is repeated until the entire image is formed. The retard roller 120 disengages as the process continues and the receiver transport 60 continues to control receiver 50 motion. The receiver transport 60 moves the receiver 50 out of the electronic printing apparatus 10 to eject the print. The receiver transport 60 and the retard roller 120 are close to the image forming position under the top electrodes 80, this improves control over the receiver motion and improves print quality.

The invention has been described in detail with particular reference to certain preferred embodiments thereof, but it will be understood that variations and modifications can be effected within the spirit and scope of the invention.

PARTS LIST

10 electronic printing apparatus
20 processing unit
30 logic and control electronics unit
40 print head
50 receiver
60 receiver transport
70 receptacle
80 top electrode
90 common electrode
100 electrically grounded shield
110 electrode structure
120 retard roller
130 platen
140 guiding plate
200 electric field-driven particle
210 fluid
220 microcapsule
230 matrix
240 substrate
250 conducting layer

What is claimed is:

1. An electronic printing apparatus for forming images on a receiver, comprising:

a) means for storing a digital image;

b) the receiver including field-driven particles in a matrix that change optical density in response to an applied electric field, a substrate, and a conductive portion disposed between the matrix and the substrate;

c) an array of electrodes cooperating with the conductive portion and a common electrode capacitively coupled to the conductive portion for selectively applying electric fields across the matrix at the image forming position so that the field-driven particles change optical density; and d) electronic control means electrically coupled to the array and the conductive portion for selectively applying voltages to the array so that fields are applied between the array of electrodes and the conductive portion at the image forming position to field-driven particles at particular locations on the receiver corresponding to pixels in the stored image whereby an image is produced in the receiver corresponding to the stored image.

2. The electronic printing apparatus of claim 1 wherein the conductive portion is provided by doping the substrate with conductive material.

3. The electronic printing apparatus of claim 1 wherein the conductive portion is provided by a conducting layer formed over the substrate.

4. An electronic printing apparatus for forming images on a receiver, comprising:

a) means for storing a digital image;

b) the receiver including field-driven particles in a matrix that change optical density in response to an applied electric field, a substrate, and a conductive portion disposed between the matrix and the substrate;

c) an array of electrodes cooperating with the conductive portion and a common electrode directly coupled to the conductive portion for selectively applying electric fields across the matrix at the image forming position so that the field-driven particles change optical density; and d) electronic control means electrically coupled to the array and the conductive portion for selectively applying voltages to the array so that fields are applied between the array of electrodes and the conductive portion at the image forming position to field-driven particles at particular locations on the receiver corresponding to pixels in the stored image whereby an image is produced in the receiver corresponding to the stored image.

* * * * *